United States Patent
Chan (10) Patent No.: US 12,068,678 B2
(45) Date of Patent: Aug. 20, 2024

(54) POWER SUPPLY DEVICE FOR SUPPRESSING SURGE

(71) Applicant: Acer Incorporated, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 224 days.

(21) Appl. No.: 17/741,633

(22) Filed: May 11, 2022

(65) Prior Publication Data

US 2022/0376609 A1 Nov. 24, 2022

(30) Foreign Application Priority Data

May 21, 2021 (TW) ................................. 110118414

(51) Int. Cl.
*H02M 1/32* (2007.01)
*H02M 3/158* (2006.01)
*H02M 7/219* (2006.01)

(52) U.S. Cl.
CPC ............. *H02M 1/32* (2013.01); *H02M 3/158* (2013.01); *H02M 7/219* (2013.01)

(58) Field of Classification Search
CPC ........ H02M 1/007; H02M 1/32; H02M 3/156; H02M 3/158; H02M 3/335; H02M 7/06; H02M 7/219
USPC ....................................................... 361/118
See application file for complete search history.

(56) References Cited

U.S. PATENT DOCUMENTS

2019/0222019 A1* 7/2019 Pai .......................... H02H 9/045

FOREIGN PATENT DOCUMENTS

| CN | 1391719 A | * | 1/2003 | ............... H01F 3/10 |
| JP | 4053614 B2 | * | 2/2008 | ............... B23H 7/08 |

OTHER PUBLICATIONS

Machine translation of Thommes Japanese Patent Document JP 4053614 B2 Nov. 1995 (Year: 1995).*
Machine translation of Riggio et al. Chinese Patent Document CN 1391719 A Sep. 2000 (Year: 2000).*

* cited by examiner

*Primary Examiner* — Kevin J Comber
(74) *Attorney, Agent, or Firm* — McClure, Qualey & Rodack, LLP (57) ABSTRACT

A power supply device for suppressing the surge includes a bridge rectifier, a first surge absorption circuit, a second surge absorption circuit, a third surge absorption circuit, and a boost converter. The bridge rectifier generates a rectified voltage according to a first input voltage and a second input voltage. The first surge absorption circuit receives the rectified voltage. The first surge absorption circuit is coupled to a ground. The second surge absorption circuit is coupled to the first surge absorption circuit. The third surge absorption circuit is coupled to the second surge absorption circuit. The third surge absorption circuit includes a transformer. The boost converter is coupled to the third surge absorption circuit, and generates an output voltage. The first surge absorption circuit provides a high impedance value. The second surge absorption circuit provides a median impedance value. The third surge absorption circuit provides a low impedance value.

10 Claims, 5 Drawing Sheets

POWER SUPPLY DEVICE FOR SUPPRESSING SURGE

CROSS REFERENCE TO RELATED APPLICATIONS

This application claims priority of Taiwan Patent Application No. 110118414 filed on May 21, 2021, the entirety of which is incorporated by reference herein.

BACKGROUND OF THE INVENTION

Field of the Invention

The disclosure generally relates to a power supply device, and more specifically, to a power supply device for eliminating the surge.

Description of the Related Art

Among the causes of surges in power supply devices, the most serious one is a surge caused by a lightning strike. Lightning surges are a natural phenomenon. If the power supply device is used in areas prone to electrical storms, it is necessary to add appropriate lightning surge protection. The most commonly used surge protection component of a conventional power supply device is a varistor, which is a component that changes its resistance value based on the voltage. When a critical voltage level is exceeded, the varistor will enter an approximate short-circuit state, which guides the surge into the varistor and dissipates it in the form of heat energy. However, if the surge energy of a lightning strike is too great, exceeding the maximum load of the varistor, it will still damage the varistor and the power supply device. Accordingly, there is a need to propose a novel solution for solving the problems of the prior art.

BRIEF SUMMARY OF THE INVENTION

In an exemplary embodiment, the invention is directed to a power supply device for suppressing surges. The power supply device includes a bridge rectifier, a first surge absorption circuit, a second surge absorption circuit, a third surge absorption circuit, and a boost converter. The bridge rectifier generates a rectified voltage according to a first input voltage and a second input voltage. The first surge absorption circuit receives the rectified voltage. The first surge absorption circuit is coupled to a ground. The second surge absorption circuit is coupled to the first surge absorption circuit. The third surge absorption circuit is coupled to the second surge absorption circuit. The third surge absorption circuit includes a transformer. The boost converter is coupled to the third surge absorption circuit, and generates an output voltage. The first surge absorption circuit provides a high impedance value. The second surge absorption circuit provides a median impedance value. The third surge absorption circuit provides a low impedance value.

In some embodiments, the bridge rectifier includes a first diode, a second diode, a third diode, and a fourth diode. The first diode has an anode coupled to a first input node for receiving the first input voltage, and a cathode coupled to a first node for outputting the rectified voltage. The second diode has an anode coupled to a second input node for receiving the second input voltage, and a cathode coupled to the first node. The third diode has an anode coupled to a ground voltage, and a cathode coupled to the first input node. The fourth diode has an anode coupled to the ground voltage, and a cathode coupled to the second input node.

In some embodiments, the first surge absorption circuit includes a Zener diode and a first inductor. The Zener diode has an anode coupled to a second node, and a cathode coupled to the first node for receiving the rectified voltage. The first inductor has a first terminal coupled to the second node, and a second terminal coupled to the ground.

In some embodiments, the first surge absorption circuit further includes a first resistor, a second resistor, a first capacitor, and a second capacitor. The first resistor has a first terminal coupled to the first node, and a second terminal coupled to a third node. The second resistor has a first terminal coupled to the third node, and a second terminal coupled to the ground. The first capacitor has a first terminal coupled to the first node, and a second terminal coupled to a fourth node. The second capacitor has a first terminal coupled to the fourth node, and a second terminal coupled to the ground.

In some embodiments, the second surge absorption circuit includes a first transistor, a second transistor, and a third transistor. The first transistor has a control terminal coupled to a fifth node, a first terminal coupled to a sixth node, and a second terminal coupled to the first node. The second transistor has a control terminal coupled to a seventh node, a first terminal coupled to an eighth node, and a second terminal coupled to the sixth node. The third transistor has a control terminal coupled to a ninth node, a first terminal coupled to a tenth node, and a second terminal coupled to the eighth node.

In some embodiments, the second surge absorption circuit further includes a third resistor, a fourth resistor, a fifth resistor, and a sixth resistor. The third resistor has a first terminal coupled to the first node, and a second terminal coupled to the tenth node. The fourth resistor has a first terminal coupled to the fifth node, and a second terminal coupled to the third node. The fifth resistor has a first terminal coupled to the seventh node, and a second terminal coupled to the third node. The sixth resistor has a first terminal coupled to the ninth node, and a second terminal coupled to the third node.

In some embodiments, the transformer of the third surge absorption circuit includes a first main coil, a second main coil, and a third main coil. The first main coil has a first terminal coupled to the tenth node, and a second terminal coupled to an eleventh node. The second main coil has a first terminal coupled to the eleventh node, and a second terminal coupled to a twelfth node. The third main coil has a first terminal coupled to the twelfth node, and a second terminal coupled to a thirteenth node.

In some embodiments, the transformer of the third surge absorption circuit further includes a first secondary coil, a second secondary coil, and a third secondary coil. The first secondary coil has a first terminal coupled to a fourteenth node, and a second terminal coupled to a fifteenth node. The second secondary coil has a first terminal coupled to the fifteenth node, and a second terminal coupled to a sixteenth node. The third secondary coil has a first terminal coupled to a seventeenth node, and a second terminal coupled to the second node.

In some embodiments, the third surge absorption circuit further includes a third capacitor, a fourth capacitor, a seventh resistor, an eighth resistor, and a ninth resistor. The third capacitor has a first terminal coupled to the eleventh node, and a second terminal coupled to the thirteenth node. The fourth capacitor has a first terminal coupled to the fifteenth node, and a second terminal coupled to the sixteenth node. The seventh resistor has a first terminal coupled to the sixteenth node, and a second terminal coupled to the ground. The eighth resistor has a first terminal coupled to the seventeenth node, and a second terminal coupled to the ground. The ninth resistor has a first terminal coupled to the seventeenth node, and a second terminal coupled to the second node.

In some embodiments, the boost converter includes a second inductor, a fifth diode, a fourth transistor, and a fifth capacitor. The second inductor has a first terminal coupled to the fourteenth node, and a second terminal coupled to the fifteenth node. The fifth diode has an anode coupled to the fifteenth node, and a cathode coupled to an output node for outputting the output voltage. The fourth transistor has a control terminal for receiving a clock voltage, a first terminal coupled to the ground voltage, and a second terminal coupled to the fifteenth node. The fifth capacitor has a first terminal coupled to the output node, and a second terminal coupled to the ground voltage.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
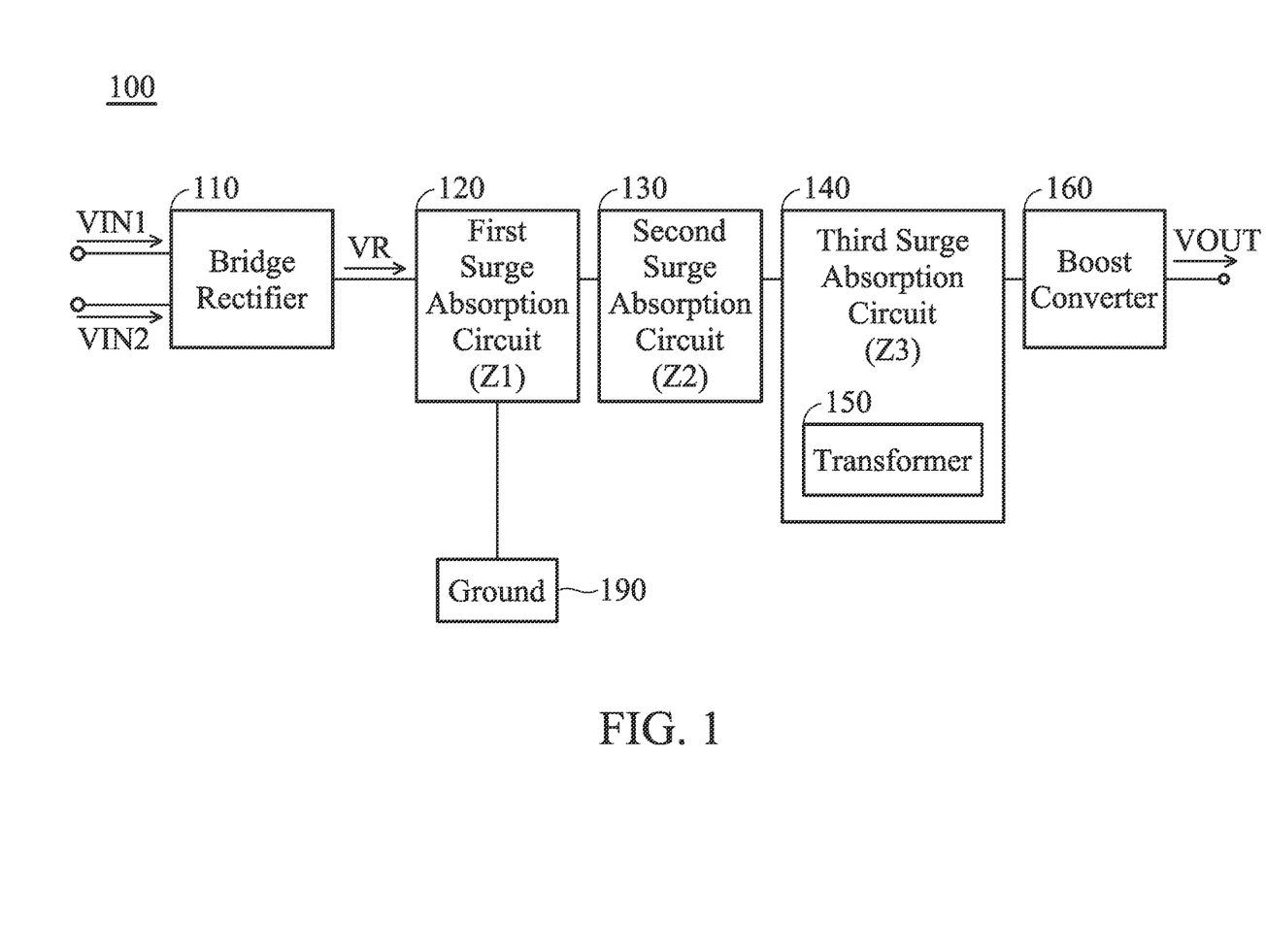
FIG. 1 is a diagram of a power supply device according to an embodiment of the invention.

FIG. 1 is a diagram of a power supply device 100 according to an embodiment of the invention. For example, the power supply device 100 may be applied to a desktop computer. As shown in FIG. 1, the power supply device 100 includes a bridge rectifier 110, a first surge absorption circuit 120, a second surge absorption circuit 130, a third surge absorption circuit 140, and a boost converter 160. It should be noted that the power supply device 100 may further include other components, such as a voltage regulator and/or a negative feedback circuit, although they are not displayed in FIG. 1.

The bridge rectifier 110 generates a rectified voltage VR according to a first input voltage VIN1 and a second input voltage VIN2. The first input voltage VIN1 and the second input voltage VIN2 may be from an external input power source. An AC (Alternating Current) voltage difference with any frequency and any magnitude may be formed between the first input voltage VIN1 and the second input voltage VIN2. For example, the frequency of the AC voltage difference may be about 50 Hz or 60 Hz, and the RMS (Root-Mean-Square) value of the AC voltage difference may be from about 90V to 264V, but they are not limited thereto. The first surge absorption circuit 120 receives the rectified voltage VR. The first surge absorption circuit 120 is coupled to a ground 190. The ground 190 may mean the Earth, or any grounding path coupled to the Earth, and it is not an internal element of the power supply device 100. The second surge absorption circuit 130 is coupled to the first surge absorption circuit 120. The third surge absorption circuit 140 is coupled to the second surge absorption circuit 130. The third surge absorption circuit 140 a transformer 150. The boost converter 160 is coupled to the third surge absorption circuit 140, and is configured to generate an output voltage VOUT. For example, the output voltage VOUT may be a DC (Direct Current) voltage, whose voltage level may be from 300V to 500V, but it is not limited thereto. It should be noted that the first surge absorption circuit 120 provides a high impedance value Z1, the second surge absorption circuit 130 provides a median impedance value Z2, and the third surge absorption circuit 140 provides a low impedance value Z3 (i.e., Z1>Z2>Z3). During a normal operation, the first surge absorption circuit 120, the second surge absorption circuit 130, and the third surge absorption circuit 140 take no action. When a high-voltage surge enters the power supply device 100, its energy can be released through the first surge absorption circuit 120, the second surge absorption circuit 130, and the third surge absorption circuit 140 to the ground 190. Therefore, such a design can prevent the power supply device 100 from being damaged. According to practical measurements, the power supply device 100 of the invention can meet the surge protection requirement of IEC (International Electrotechnical Commission), especially for the lightning test part of IEC 61000-4-5.

The following embodiments will introduce the detailed structure and operation of the power supply device 100. It should be understood these figures and descriptions are merely exemplary, rather than limitations of the invention.

Figure 2:
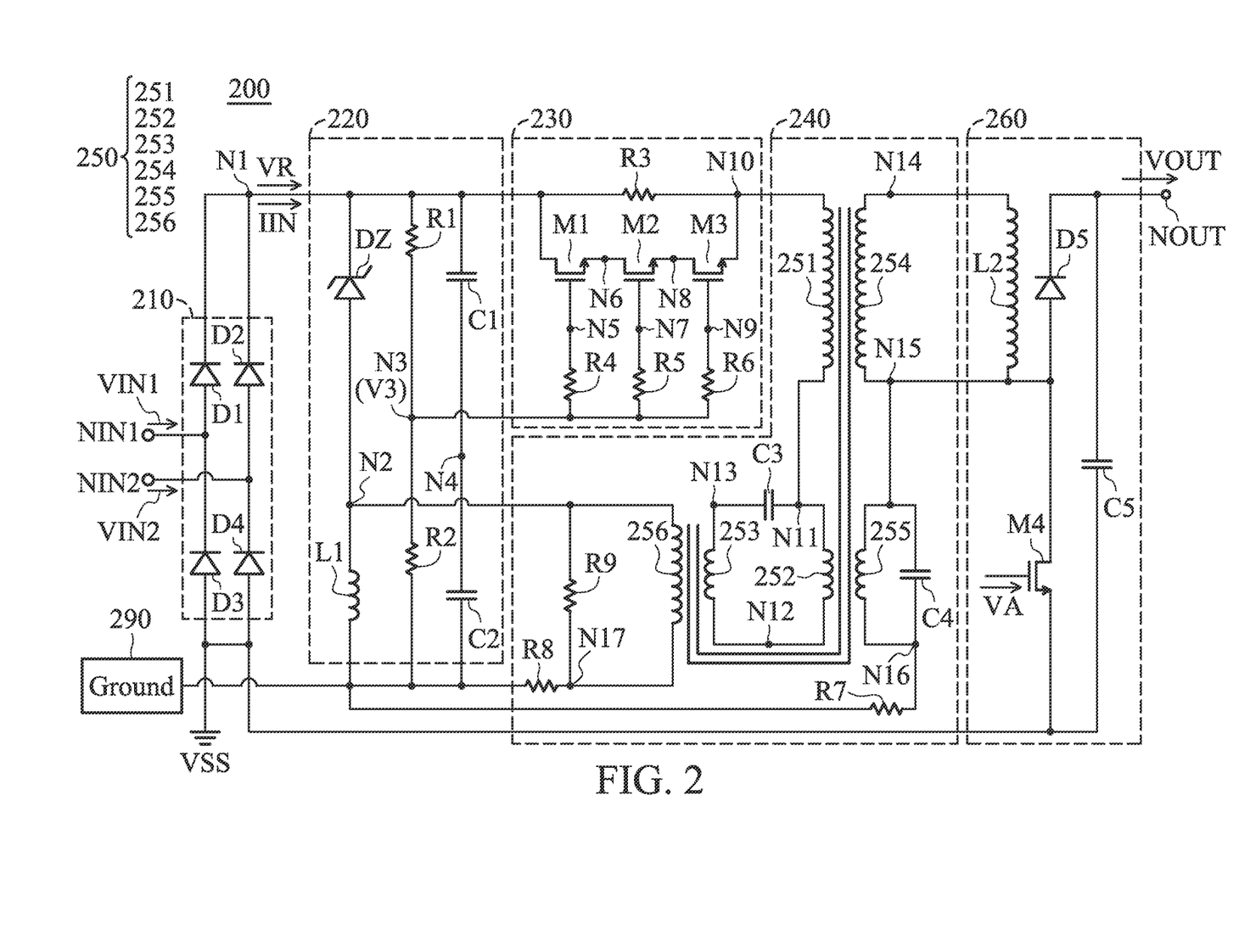
FIG. 2 is a diagram of a power supply device according to an embodiment of the invention.

FIG. 2 is a diagram of a power supply device 200 according to an embodiment of the invention. In the embodiment of FIG. 2, the power supply device 200 with a first input node NIN1, a second input node NIN2 and an output node NOUT includes a bridge rectifier 210, a first surge absorption circuit 220, a second surge absorption circuit 230, a third surge absorption circuit 240, and a boost converter 260. The third surge absorption circuit 240 includes a transformer 250. The first input node NIN1 and the second input node NIN2 of the power supply device 200 are arranged for receiving a first input voltage VIN1 and a second input voltage VIN2 from an external input power source, respectively. The output node NOUT of the power supply device 200 is arranged for outputting an output voltage VOUT to an electronic device (not shown). It should be understood that a high-voltage surge caused by lightning strikes or other reasons may enter any one of the first input node NIN1 and the second input node NIN2 of the power supply device 200.

The bridge rectifier 210 includes a first diode D1, a second diode D2, a third diode D3, and a fourth diode D4. The first diode D1 has an anode coupled to the first input node NIN1, and a cathode coupled to a first node N1 for outputting a rectified voltage VR. The second diode D2 has an anode coupled to the second input node NIN2, and a cathode coupled to the first node N1. The third diode D3 has an anode coupled to a ground voltage VSS (e.g., 0V), and a cathode coupled to the first input node N1N1. The fourth diode D4 has an anode coupled to the ground voltage VSS, and a cathode coupled to the second input node NIN2.

The first surge absorption circuit 220 includes a Zener diode DZ, a first inductor L1, a first resistor R1, a second resistor R2, a first capacitor C1, and a second capacitor C2. The Zener diode DZ has an anode coupled to a second node N2, and a cathode coupled to the first node N1 for receiving the rectified voltage VR. In some embodiments, the Zener diode DZ is replaced with a plurality of Zener diodes which are coupled in series, so as to provide a higher breakdown voltage. The first inductor L1 has a first terminal coupled to the second node N2, and a second terminal coupled to a ground 290. The ground 290 may mean the Earth, or any grounding path coupled to the Earth, and it is not an internal element of the power supply device 200.

The first resistor R1 has a first terminal coupled to the first node N1, and a second terminal coupled to a third node N3. The second resistor R2 has a first terminal coupled to the third node N3, and a second terminal coupled to the ground 290. In some embodiments, the first resistor R1 and/or the second resistor R2 are/is replaced with a plurality of resistors which are coupled in series, so as to provide a larger resistance. The first capacitor C1 has a first terminal coupled to the first node N1, and a second terminal coupled to a fourth node N4. The second capacitor C2 has a first terminal coupled to the fourth node N4, and a second terminal coupled to the ground 290.

The second surge absorption circuit 230 includes a first transistor M1, a second transistor M2, a third transistor M3, a third resistor R3, a fourth resistor R4, a fifth resistor R5, and a sixth resistor R6. Each of the first transistor M1, second transistor M2, and the third transistor M3 may be an NMOS transistor (N-type Metal Oxide Semiconductor Field Effect Transistor). The first transistor M1 has a control terminal (e.g., a gate) coupled to a fifth node N5, a first terminal (e.g., a source) coupled to a sixth node N6, and a second terminal (e.g., a drain) coupled to the first node N1. The second transistor M2 has a control terminal (e.g., a gate) coupled to a seventh node N7, a first terminal (e.g., a source) coupled to an eighth node N8, and a second terminal (e.g., a drain) coupled to the sixth node N6. The third transistor M3 has a control terminal (e.g., a gate) coupled to a ninth node N9, a first terminal (e.g., a source) coupled to a tenth node N10, and a second terminal (e.g., a drain) coupled to the eighth node N8.

The third resistor R3 has a first terminal coupled to the first node N1, and a second terminal coupled to the tenth node N10. In some embodiments, the third resistor R3 is replaced with a plurality of resistors which are coupled in series, so as to provide a larger resistance. The fourth resistor R4 has a first terminal coupled to the fifth node N5, and a second terminal coupled to the third node N3. The fifth resistor R5 has a first terminal coupled to the seventh node N7, and a second terminal coupled to the third node N3. The sixth resistor R6 has a first terminal coupled to the ninth node N9, and a second terminal coupled to the third node N3.

The third surge absorption circuit 240 includes a transformer 250, a third capacitor C3, a fourth capacitor C4, a seventh resistor R7, an eighth resistor R8, and a ninth resistor R9. The transformer 250 includes a first main coil 251, a second main coil 252, a third main coil 253, a first secondary coil 254, a second secondary coil 255, and a third secondary coil 256. The first main coil 251, the second main coil 252, and the third main coil 253 may be positioned at the same side of the transformer 250 (e.g., the primary side), and they may be coupled in series with each other. The first secondary coil 254, the second secondary coil 255, and the third secondary coil 256 may be positioned at the opposite side of the transformer 250 (e.g., the secondary side, which may be isolated from the primary side), and they may be coupled in series with each other.

The first main coil 251 has a first terminal coupled to the tenth node N10, and a second terminal coupled to an eleventh node N11. The second main coil 252 has a first terminal coupled to the eleventh node N11, and a second terminal coupled to a twelfth node N12. The third main coil 253 has a first terminal coupled to the twelfth node N12, and a second terminal coupled to a thirteenth node N13. The first secondary coil 254 has a first terminal coupled to a fourteenth node N14, and a second terminal coupled to a fifteenth node N15. The second secondary coil 255 has a first terminal coupled to the fifteenth node N15, and a second terminal coupled to a sixteenth node N16. The third secondary coil 256 has a first terminal coupled to a seventeenth node N17, and a second terminal coupled to the second node N2.

The third capacitor C3 has a first terminal coupled to the eleventh node N11, and a second terminal coupled to the thirteenth node N13. The fourth capacitor C4 has a first terminal coupled to the fifteenth node N15, and a second terminal coupled to the sixteenth node N16. The seventh resistor R7 has a first terminal coupled to the sixteenth node N16, and a second terminal coupled to the ground 290. The eighth resistor R8 has a first terminal coupled to the seventeenth node N17, and a second terminal coupled to the ground 290. The ninth resistor R9 has a first terminal coupled to the seventeenth node N17, and a second terminal coupled to the second node N2. In some embodiments, the ninth resistor R9 is replaced with a plurality of resistors which are coupled in series, so as to provide a larger resistance.

The boost converter 260 includes a second inductor L2, a fifth diode D5, a fourth transistor M4, and a fifth capacitor C5. The second inductor L2 has a first terminal coupled to the fourteenth node N14, and a second terminal coupled to the fifteenth node N15. The fifth diode D5 has an anode coupled to the fifteenth node N15, and a cathode coupled to an output node NOUT. The fourth transistor M4 may be an NMOS transistor. The fourth transistor M4 has a control terminal (e.g., a gate) for receiving a clock voltage VA, a first terminal (e.g., a source) coupled to the ground voltage VSS, and a second terminal (e.g., a drain) coupled to the fifteenth node N15. For example, the clock voltage VA may be maintained at a constant voltage level when the power supply device 200 is initialized, and the clock voltage VA may provide periodic clock waveforms when the power supply device 200 is normally operated. The fifth capacitor C5 has a first terminal coupled to the output node NOUT, and a second terminal coupled to the ground voltage VSS.

In some embodiments, the mechanism of surge suppression of the power supply device 200 will be described as follows. When a high-voltage surge enters the first input node NIN1 or the second input node NIN2, its energy may be transmitted to the first surge absorption circuit 220 in the beginning. If the energy of the high-voltage surge is enough, the voltage V3 at the third node N3 will exceed a threshold voltage, so as to enable three transistors in the second surge absorption circuit 230. Next, the energy of the high-voltage surge may be further transmitted to the third surge absorption circuit 240, and may be released through the transformer 250 to the ground 290. Conversely, if there is no high-voltage surge, the first surge absorption circuit 220, the second surge absorption circuit 230, and the third surge absorption circuit 240 will take no action, and the rectified voltage VR may be directly converted into the output voltage VOUT by the boost converter 260.

Figure 3:
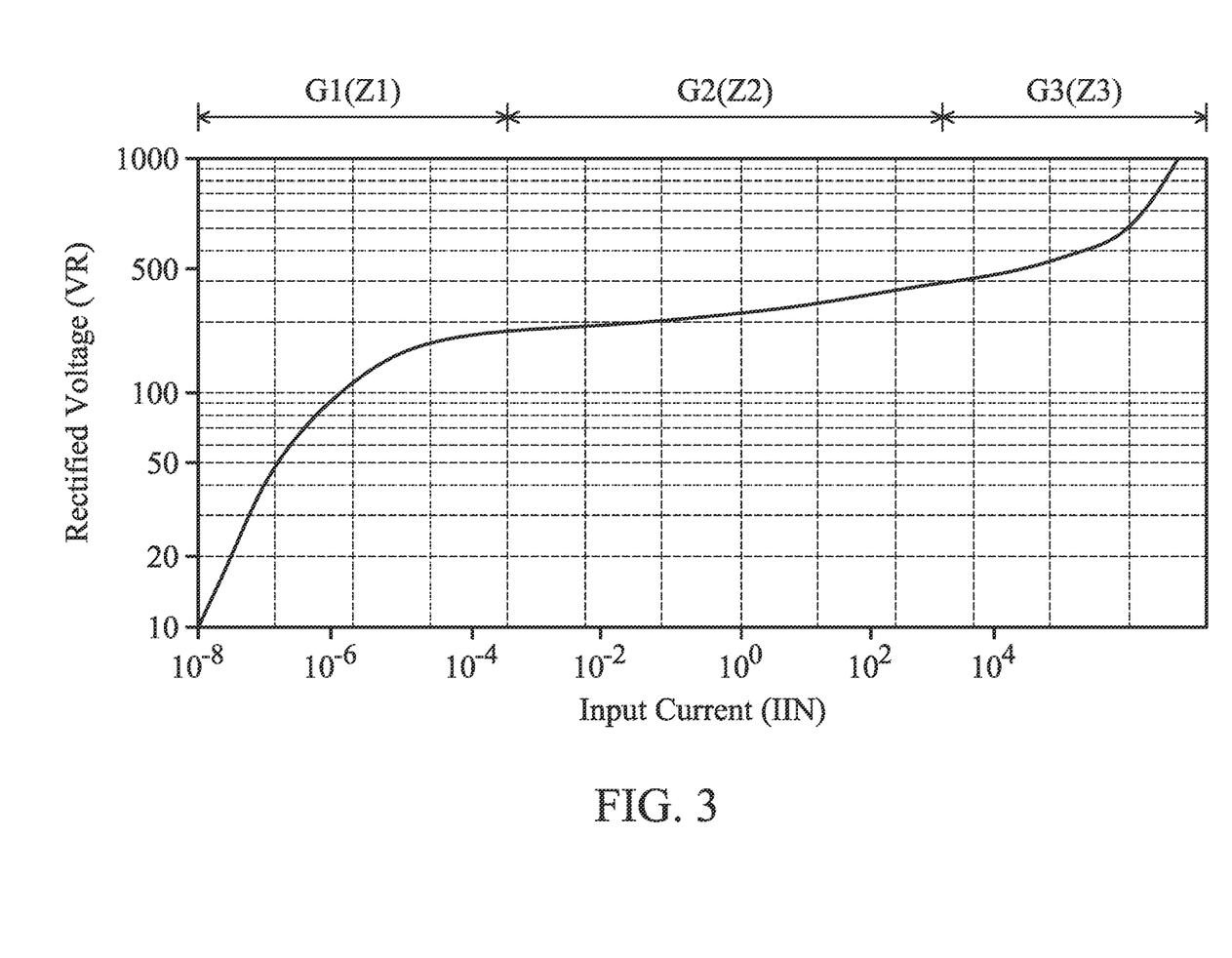
FIG. 3 is a diagram of relationship between a rectified voltage and an input current of a power supply device according to an embodiment of the invention.

FIG. 3 is a diagram of the relationship between the rectified voltage VR and an input current IIN of the power supply device 200 according to an embodiment of the invention, and it may be measured at the first node N1. The horizontal axis represents the magnitude of the input current IIN, and the vertical axis represents the voltage level of the rectified voltage VR. According to the measurement of FIG. 3, the impedance characteristic of the power supply device 200 (i.e., the slope of FIG. 3) may be divided into a first region G1, a second region G2, and a third region G3. The first region G1 corresponds to the first surge absorption circuit 220, and it provides a high impedance value Z1. The second region G2 corresponds to the second surge absorption circuit 230, and it provides a median impedance value Z2. The third region G3 corresponds to the third surge absorption circuit 240, and it provides a low impedance value Z3.

Figure 4:
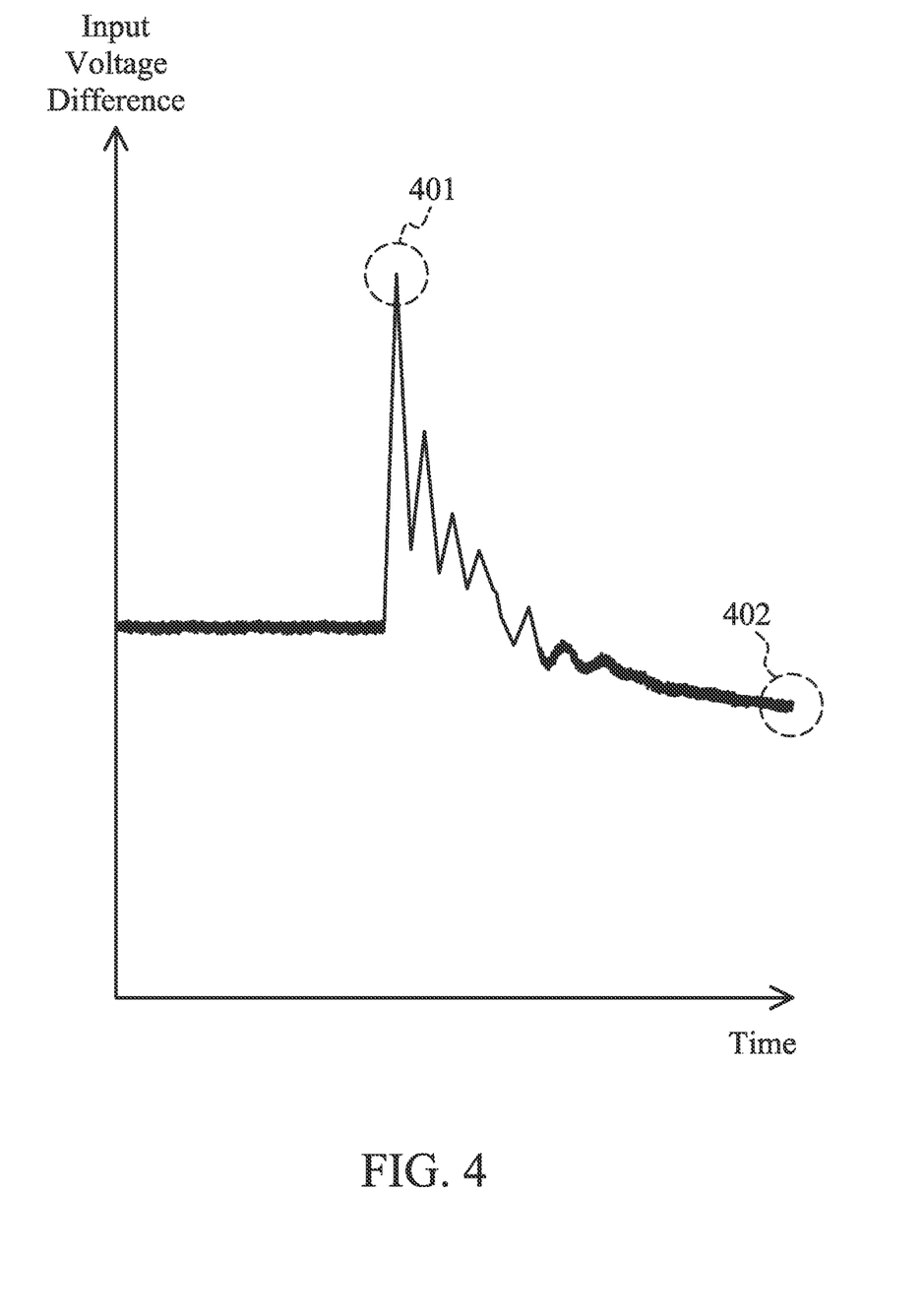
FIG. 4 is a diagram of surge test of a convention power supply device.

FIG. 4 is a diagram of surge test of a convention power supply device. The vertical axis represents the input voltage difference, and the horizontal axis represents the time. According to the measurement of FIG. 4, when a high-voltage surge enters the conventional power supply device using a varistor, the input voltage difference may become significantly high (as indicated by a first dashed box 401). Furthermore, after many times of surge tests, the varistor may be damaged, and the input voltage difference may attenuate fast and cannot recover to its original level (as indicated by a second dashed box 402).

Figure 5:
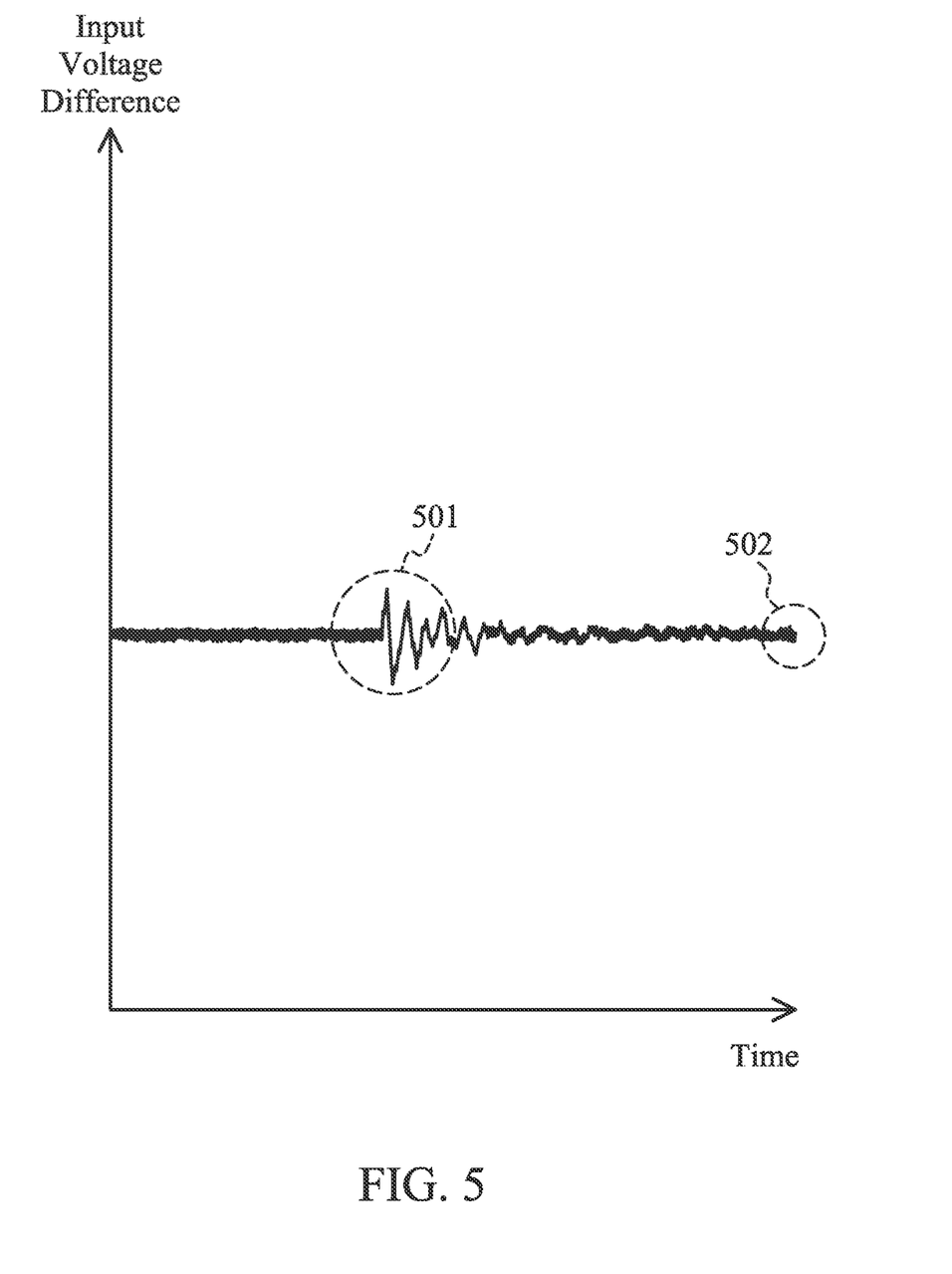
FIG. 5 is a diagram of surge test of a power supply device according to an embodiment of the invention.

FIG. 5 is a diagram of surge test of the power supply device 200 according to an embodiment of the invention. The vertical axis represents the input voltage difference (i.e., the voltage difference between the first input voltage VIN1 and the second input voltage VIN2), and the horizontal axis represents the time. According to the measurement of FIG. 5, when a high-voltage surge enters the power supply device 200 using the first surge absorption circuit 220, the second surge absorption circuit 230, and the third surge absorption circuit 240, the input voltage difference may fluctuate within a small range (as indicated by a third dashed box 501). Furthermore, after many times of surge tests, the input voltage difference may substantially maintain its original level (as indicated by a fourth dashed box 502) because no varistor can be damaged.

In some embodiments, the element parameters of the power supply device 200 are as follows. The inductance of the first inductor L1 may be from 0.9 mH to 1.1 mH, such as 1 mH. The inductance of the second inductor L2 may be from 324 sH to 396 pH, such as 360 sH. The capacitance of the first capacitor C1 may be from 85 μF to 115 μF, such as 100 μF. The capacitance of the second capacitor C2 may be from 85 μF to 115 μF, such as 100 μF. The capacitance of the third capacitor C3 may be from 0.8 μF to 1.2 μF, such as 1 μF. The capacitance of the fourth capacitor C4 may be from 0.8 μF to 1.2 μF, such as 1 μF. The capacitance of the fifth capacitor C5 may be from 544 μF to 816 μF, such as 680 μF. The resistance of the first resistor R1 may be from 43.2 MΩ to 52.8 MΩ, such as 48 MΩ. The resistance of the second resistor R2 may be from 0.9 MΩ to 1.1 MΩ, such as 1 MΩ. The resistance of the third resistor R3 may be from 510KΩ to 690KΩ, such as 600KΩ. The resistance of the fourth resistor R4 may be from 95Ω to 105Ω, such as 100Ω. The resistance of the fifth resistor R5 may be from 95Ω to 105Ω, such as 100Ω. The resistance of the sixth resistor R6 may be from 95Ω to 105Ω, such as 100Ω. The resistance of the seventh resistor R7 may be from 0.9KΩ to 1.1KΩ, such as 1KΩ. The resistance of the eighth resistor R8 may be from 0.9KΩ to 1.1KΩ, such as 1KΩ. The resistance of the ninth resistor R9 may be from 18KΩ to 22KΩ, such as 20KΩ. The turn ratio of the first main coil 251 to the second main coil 252 may be from 0.1 to 10, such as about 2. The turn ratio of the first main coil 251 to the third main coil 253 may be from 0.1 to 10, such as about 2. The turn ratio of the first main coil 251 to the first secondary coil 254 may be from 0.1 to 10, such as about 1. The turn ratio of the first main coil 251 to the second secondary coil 255 may be from 0.1 to 10, such as about 2. The turn ratio of the first main coil 251 to the third secondary coil 256 may be from 0.1 to 10, such as about 6. The above ranges of parameters are calculated and obtained according to the results of many experiments, and they help to optimize the mechanism of surge protection of the power supply device 200.

The invention proposes a novel power supply device, which includes three surge absorption circuits. According to practical measurements, the power supply device using the aforementioned design can effectively prevent high-voltage surges from damaging the circuitry, and therefore it is suitable for application in a variety of devices.

Note that the above voltages, currents, resistances, inductances, capacitances and other element parameters are not limitations of the invention. A designer can adjust these parameters according to different requirements. The power supply device of the invention is not limited to the configurations of FIGS. 1-5. The invention may merely include any one or more features of any one or more embodiments of FIGS. 1-5. In other words, not all of the features displayed in the figures should be implemented in the power supply device of the invention. Although the embodiments of the invention use MOSFET as examples, the invention is not limited thereto, and those skilled in the art may use other types of transistors, such as BJT (Bipolar Junction Transistor), JFET (Junction Gate Field Effect Transistor), FinFET (Fin Field Effect Transistor), etc., without affecting the performance of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered exemplary only, with the true scope of the disclosed embodiments being indicated by the following claims and their equivalents.

What is claimed is:

1. A power supply device for suppressing surge, comprising:
   a bridge rectifier, generating a rectified voltage according to a first input voltage and a second input voltage;
   a first surge absorption circuit, receiving the rectified voltage, wherein the first surge absorption circuit is coupled to a ground;
   a second surge absorption circuit, coupled to the first surge absorption circuit;
   a third surge absorption circuit, coupled to the second surge absorption circuit, wherein the third surge absorption circuit comprises a transformer; and
   a boost converter, coupled to the third surge absorption circuit, and generating an output voltage;
   wherein the first surge absorption circuit provides a first impedance value, the second surge absorption circuit provides a second impedance value, and the third surge absorption circuit provides a third impedance value;
   wherein the first impedance value is greater than the second impedance value, and the second impedance value is greater than the third impedance value.

2. The power supply device as claimed in claim 1, wherein the bridge rectifier comprises:
   a first diode, wherein the first diode has an anode coupled to a first input node for receiving the first input voltage, and a cathode coupled to a first node for outputting the rectified voltage;
   a second diode, wherein the second diode has an anode coupled to a second input node for receiving the second input voltage, and a cathode coupled to the first node;
   a third diode, wherein the third diode has an anode coupled to a ground voltage, and a cathode coupled to the first input node; and
   a fourth diode, wherein the fourth diode has an anode coupled to the ground voltage, and a cathode coupled to the second input node.

3. The power supply device as claimed in claim 2, wherein the first surge absorption circuit comprises:
   a Zener diode, wherein the Zener diode has an anode coupled to a second node, and a cathode coupled to the first node for receiving the rectified voltage; and
   a first inductor, wherein the first inductor has a first terminal coupled to the second node, and a second terminal coupled to the ground.

4. The power supply device as claimed in claim 3, wherein the first surge absorption circuit further comprises:
   a first resistor, wherein the first resistor has a first terminal coupled to the first node, and a second terminal coupled to a third node;
   a second resistor, wherein the second resistor has a first terminal coupled to the third node, and a second terminal coupled to the ground;
   a first capacitor, wherein the first capacitor has a first terminal coupled to the first node, and a second terminal coupled to a fourth node; and
   a second capacitor, wherein the second capacitor has a first terminal coupled to the fourth node, and a second terminal coupled to the ground.

5. The power supply device as claimed in claim 4, wherein the second surge absorption circuit comprises:
   a first transistor, wherein the first transistor has a control terminal coupled to a fifth node, a first terminal coupled to a sixth node, and a second terminal coupled to the first node;
   a second transistor, wherein the second transistor has a control terminal coupled to a seventh node, a first terminal coupled to an eighth node, and a second terminal coupled to the sixth node; and
   a third transistor, wherein the third transistor has a control terminal coupled to a ninth node, a first terminal coupled to a tenth node, and a second terminal coupled to the eighth node.

6. The power supply device as claimed in claim 5, wherein the second surge absorption circuit further comprises:
   a third resistor, wherein the third resistor has a first terminal coupled to the first node, and a second terminal coupled to the tenth node;
   a fourth resistor, wherein the fourth resistor has a first terminal coupled to the fifth node, and a second terminal coupled to the third node;
   a fifth resistor, wherein the fifth resistor has a first terminal coupled to the seventh node, and a second terminal coupled to the third node; and
   a sixth resistor, wherein the sixth resistor has a first terminal coupled to the ninth node, and a second terminal coupled to the third node.

7. The power supply device as claimed in claim 6, wherein the transformer of the third surge absorption circuit comprises:
   a first main coil, wherein the first main coil has a first terminal coupled to the tenth node, and a second terminal coupled to an eleventh node;
   a second main coil, wherein the second main coil has a first terminal coupled to the eleventh node, and a second terminal coupled to a twelfth node; and
   a third main coil, wherein the third main coil has a first terminal coupled to the twelfth node, and a second terminal coupled to a thirteenth node.

8. The power supply device as claimed in claim 7, wherein the transformer of the third surge absorption circuit further comprises:
   a first secondary coil, wherein the first secondary coil has a first terminal coupled to a fourteenth node, and a second terminal coupled to a fifteenth node;
   a second secondary coil, wherein the second secondary coil has a first terminal coupled to the fifteenth node, and a second terminal coupled to a sixteenth node; and
   a third secondary coil, wherein the third secondary coil has a first terminal coupled to a seventeenth node, and a second terminal coupled to the second node.

9. The power supply device as claimed in claim 8, wherein the third surge absorption circuit further comprises:
   a third capacitor, wherein the third capacitor has a first terminal coupled to the eleventh node, and a second terminal coupled to the thirteenth node;
   a fourth capacitor, wherein the fourth capacitor has a first terminal coupled to the fifteenth node, and a second terminal coupled to the sixteenth node;
   a seventh resistor, wherein the seventh resistor has a first terminal coupled to the sixteenth node, and a second terminal coupled to the ground;
   an eighth resistor, wherein the eighth resistor has a first terminal coupled to the seventeenth node, and a second terminal coupled to the ground; and
   a ninth resistor, wherein the ninth resistor has a first terminal coupled to the seventeenth node, and a second terminal coupled to the second node.

10. The power supply device as claimed in claim 9, wherein the boost converter comprises:
    a second inductor, wherein the second inductor has a first terminal coupled to the fourteenth node, and a second terminal coupled to the fifteenth node;

a fifth diode, wherein the fifth diode has an anode coupled to the fifteenth node, and a cathode coupled to an output node for outputting the output voltage;

a fourth transistor, wherein the fourth transistor has a control terminal for receiving a clock voltage, a first terminal coupled to the ground voltage, and a second terminal coupled to the fifteenth node; and a fifth capacitor, wherein the fifth capacitor has a first terminal coupled to the output node, and a second terminal coupled to the ground voltage.

* * * * *